United States Patent

Snavely

[11] Patent Number: 5,445,001
[45] Date of Patent: Aug. 29, 1995

[54] METHOD AND APPARATUS FOR FORMING AND CUTTING TUBING

[75] Inventor: Gary L. Snavely, Milford, Mich.

[73] Assignee: General Motors Corporation, Detroit, Mich.

[21] Appl. No.: 288,631

[22] Filed: Aug. 10, 1994

[51] Int. Cl.⁶ .............................................. B21D 26/02
[52] U.S. Cl. ...................................... 72/55; 219/68
[58] Field of Search .................. 219/68; 83/16, 170; 72/55

[56] References Cited

U.S. PATENT DOCUMENTS

| | | | |
|---|---|---|---|
| 2,851,580 | 9/1958 | Taylor | 219/68 |
| 3,035,148 | 5/1962 | Oakley | 219/68 |
| 3,567,088 | 3/1971 | Anderson | 225/103 |
| 3,597,569 | 8/1971 | Gerber | 219/68 |
| 3,786,662 | 1/1974 | Roth | 72/55 |
| 5,133,492 | 7/1992 | Wohrstein | 225/2 |
| 5,201,117 | 4/1993 | Wright | 29/890.05 |
| 5,233,856 | 8/1993 | Shimanovski et al. | 72/62 |

FOREIGN PATENT DOCUMENTS

| | | | |
|---|---|---|---|
| 60213 | 10/1954 | France | 219/68 |
| 1296267 | 3/1987 | U.S.S.R. | 72/55 |

*Primary Examiner*—David Jones
*Attorney, Agent, or Firm*—Patrick M. Griffin

[57] ABSTRACT

A novel method of cutting a complexly shaped end edge of a tube is incorporated into the apparatus for forming the tube to shape. Hydroforming dies are provided with a pair of sharp ribs which, simultaneously with the pressurized expansion of the tube out into the die cavities, cut a groove into the surface of the tube. The groove matches the shape of the cut end edge desired, and locally increases the electrical resistance of the tube at the groove, but does not cut all the way through the tube wall. Then, a high electrical current is applies to the tube to either side of the groove, which selectively heats and melts the tube at the higher resistance grooved area.

1 Claim, 3 Drawing Sheets

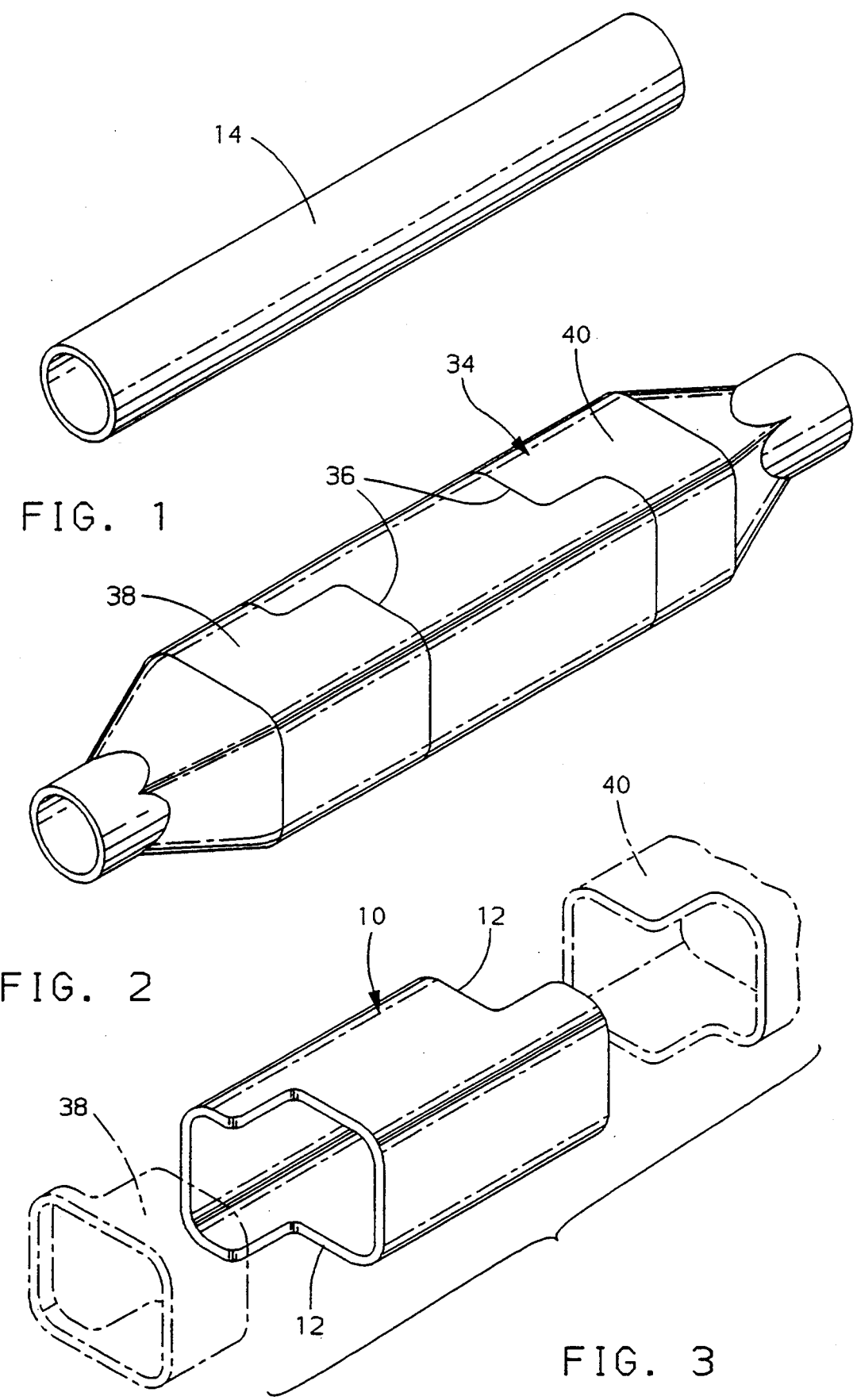

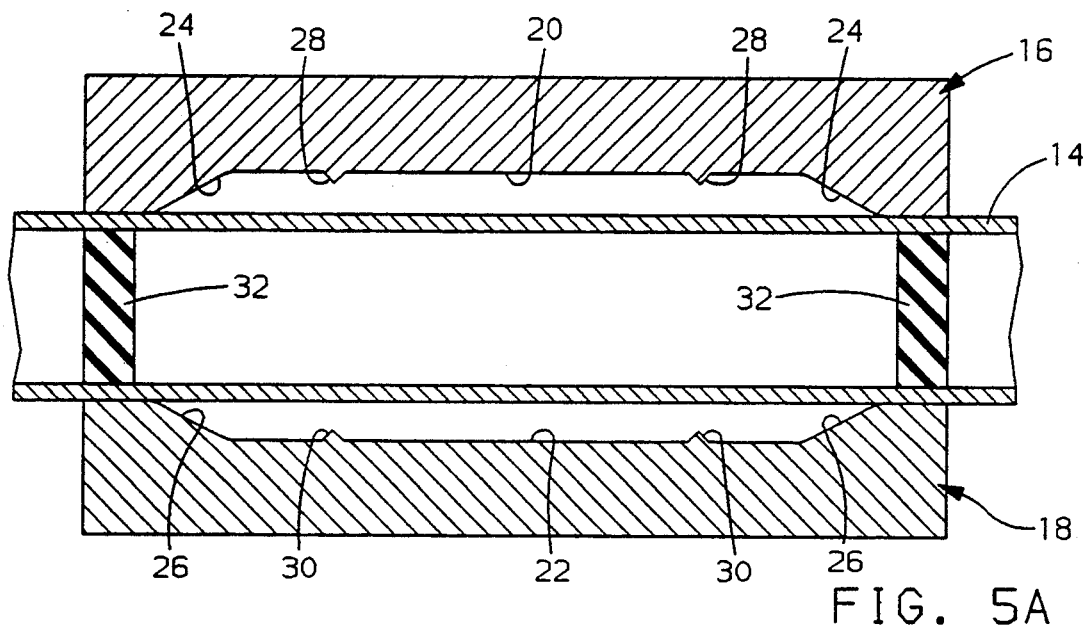
FIG. 5A
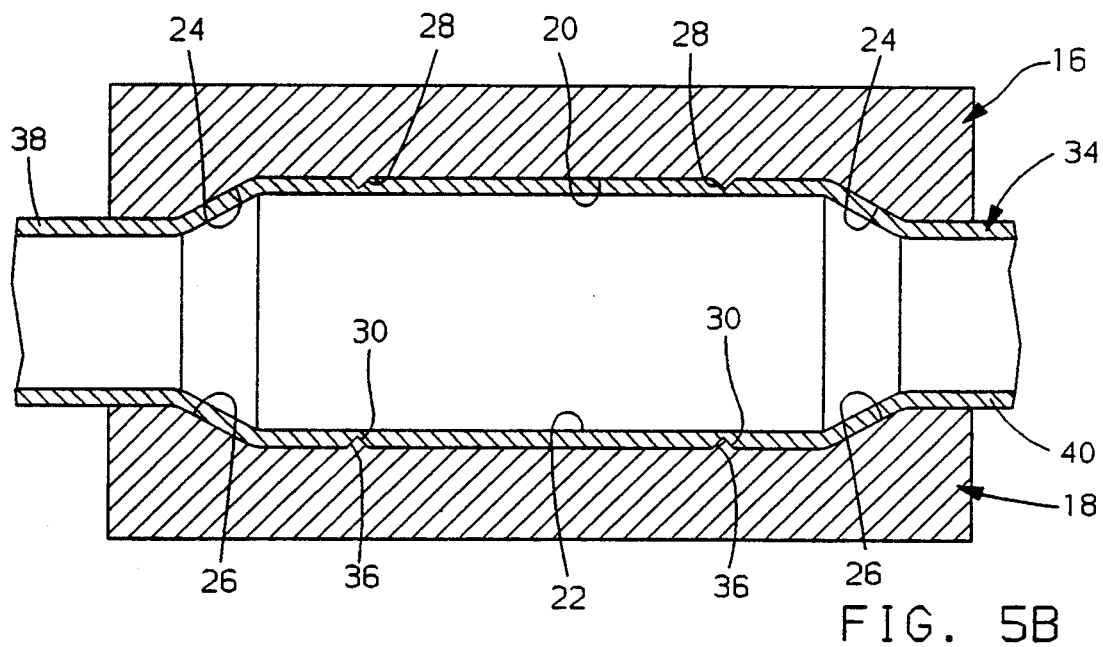
FIG. 5B
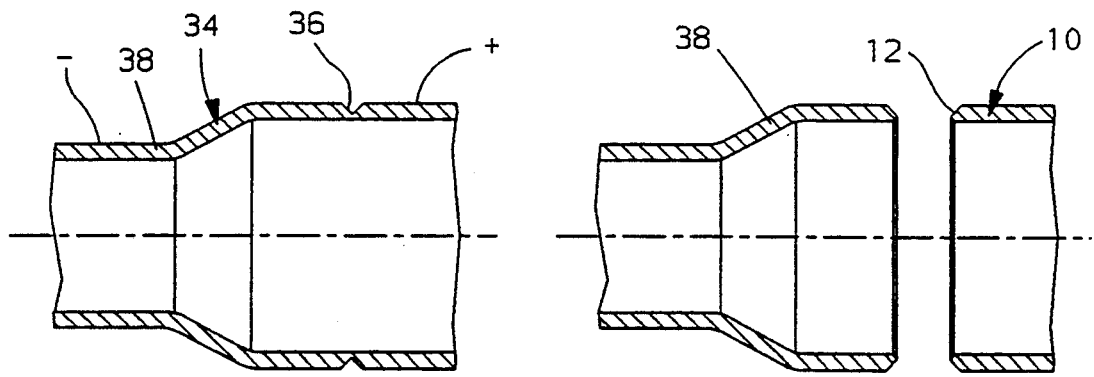
FIG. 5C                              FIG. 5D

METHOD AND APPARATUS FOR FORMING AND CUTTING TUBING

This invention relates to methods of tube cutting in general, and specifically to a method for cooperatively forming and cutting tubing.

BACKGROUND OF THE INVENTION

Two manufacturing methods related to different aspects of forming metal tubing have typically been practiced independently, cutting to length, and forming to shape. Cutting metal tubing to length is generally done by some mechanical method and apparatus. Most commonly, tubing is simply cut, as by sawing, or scored and fractured by bending transverse to the axis of the tube. Scoring and fracturing is done when it is desired to minimize the chips and burrs that result from sawing, though doing so has the potential for bending and deforming the cut edge that is produced. This is because it is essentially impossible to provide a mandrel to support the interior of the tube around the fracture line. One proposal for a fractured cutting method that provides a cleaner edge is disclosed in U.S. Pat. No. 3,567,088 issued Mar. 2, 1971 to George L. Anderson. In one embodiment, a solid, but split, mandrel is inserted in the interior of the round tubes, with the two ends of the split mandrel abutted in a plane. Then a shear force is applied, perpendicular to the tube axis, along the plane between the abutted mandrel ends. This works well when the cut edge is simple, and also lies in a plane, but not otherwise. In another embodiment, the interior of the tube is pressurized with a fluid that is injected between two interior plugs that border the shear plane. The tube is then sheared along the plane in the same fashion. Not only does this work only when the cut edge lies in a plane, but the shearing action allows pressurized fluid to escape. Another proposal for avoiding the deformed edge produced by scoring and bending is disclosed in U.S. Pat. No. 5,133,492 issued Jul. 28, 1992 to Wohrstein, et al. A score line or groove is cut into the tube wall as usual, but the two parts of the tube are pulled straight apart, along the tube axis, rather than snapped apart perpendicular to the axis. As a practical matter, there is still deformation of the edge produced, just in a different direction.

Forming tubes to shape is increasingly done by hydroforming. A tube blank, usually a simple cylindrical tube, is clamped between a pair of die cavities that create a surrounding hollow space that is typically larger in circumference than the tube blank, although some areas may be smaller. The ends of the tube are sealed and its interior is highly pressurized to forcibly expand it out into the shape of the surrounding space. Complex shapes can be produced in this fashion, such as the beam members of a vehicle body frame or engine cradle. Welding and cutting operations are eliminated, at least as to each of the separate beam members, which themselves would otherwise have to be fabricated and welded from separate pieces. However, the beam members must still be welded or otherwise secured together at their ends. This requires cutting the formed tube to length, and, often, the cut ends must have a complex shape in order to be adequately welded to the other formed tubes that make up the frame. The cut off methods described above are inadequate for that task. Whatever cutting method is used, it is a separate, independent task that follows the hydroforming process itself, adding time and expense.

SUMMARY OF THE INVENTION

The invention provides a method and apparatus for cutting tubing that prevents edge deformation, and which works as an integral, cooperative part of a hydroforming process.

In the preferred embodiment disclosed, the part produced is a hydroformed beam with cut end edges of complex shape. The beams are formed from simple cylindrical tube blanks that are held between a pair of die cavities that define a larger hollow space surrounding the blank. The surface of each of the die cavities includes a protruding sharp rib that mates with the rib on the other cavities surface, corresponding in shape to the desired cut edge. The wall thickness of the tube blank is reduced somewhat as it is expanded, and the height of the cutting edges is deliberately less than that ultimate wall thickness.

When the tube blank is expanded out to shape, the ribs cut into its outer surface to produce a score line or groove matching the desired cut edge shape. The groove is not deep enough to actually pierce the surface, so the hydroforming process proceeds as usual, with no loss of pressure, and with no extra steps or apparatus features needed. After the formed, but uncut, tube blank is removed, the ends must still be parted at the scored line. Rather than mechanically fracturing or bending, which would be especially harmful to an edge of complex shape, an electrical current is applied to either side of the groove. While not deep enough to cut the wall, the groove is deep enough to significantly increase its electrical resistance at the groove. As a consequence, the wall material melts through at the groove, producing a clean, undeformed edge with the desired complex shape.

DESCRIPTION OF THE PREFERRED EMBODIMENT

These and other features of the invention will appear from the following written description, and from the drawings in which:

FIG. 1 is a perspective view of a tube blank;

FIG. 2 is a perspective view of the intermediate stage produce from the blank, prior to end cutting;

FIG. 3 is a perspective view of the formed and cut tube, showing part of the cut ends in phantom line;

FIG. 5A is a cross section through the dies, cavities, and tube blank prior to forming;

FIG. 5B shows the tube after forming, prior to removal and cutting;

FIG. 5C shows a cross section through the formed tube at the groove, prior to cutting, with a current being applied across the groove;

FIG. 5D shows the end cut away;

Referring first to FIG. 1, the part to be produced is a formed metal tube, indicated generally at 10, with a basically rectangular cross section, and which is shown in a shortened form so as to illustrate each end. Tube 10 could be steel, aluminum, or any other conductive material, though it is unlikely that it would be anything but metal. The actual length and cross sectional shape of tube 10 is not so important to the subject invention as the fact that it has two end edges 12 of complex shape. The edges 12 define what is termed a single glove joint, which would ultimately interfit with a slot in another part, to which it would be welded as part of a larger frame structure. By complex, it is meant that the edges 12 do not lie in a plane, or at least not in a plane that is perpendicular to the length axis of tube 10. As a consequence, the edges 12 are not amenable to conventional cutting or fracturing techniques. The invention provides a method and apparatus for producing the edges 12 that works well, and which also works in conjunction with the forming process.

Figure 4:
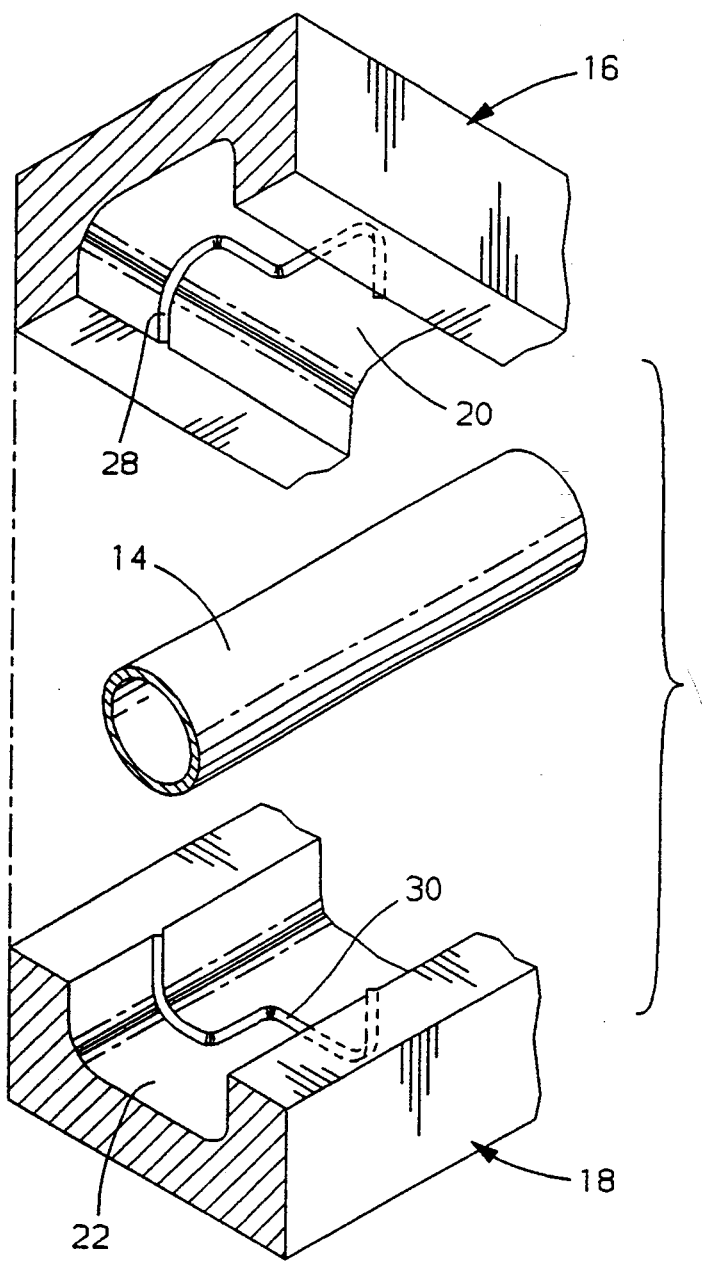
FIG. 4 is a perspective view of part of the die cavities with the tube blank between, showing the sharp cutting ribs in the cavity surfaces.

Referring next to FIGS. 1 and 4, tube 10 is produced from an initial, unformed blank 14 that is a simple stock cylinder. It could be cut to length by conventional techniques, such as sawing, because its end edges are simple circles, lying in planes perpendicular to the central axis. The diameter of tube blank 14 is less than the final outer dimension of tube 10, but its thickness is greater than the ultimate wall thickness of formed tube 10. To form tube blank 14 to shape, a pair of dies, an upper die indicated generally at 16, and lower die 18, are each machined with a cavity surface 20 and 22 respectively. The cavity surfaces 20 and 22 define the ultimate outer surface of fully formed tube 10. At each end, the cavity surfaces 20 and 22 taper in to a cylindrical yoke 24 and 26 respectively, which closely match the diameter of cylindrical tube blank 14. This much of dies 16 and 18 is typical of hydroforming dies, as those skilled in the art will recognize. In addition, each die cavity surface 20 and 22 includes a pair of sharp ribs 28 and 30, which are triangular in cross section. All of the ribs 28 and 30 protrude to a height that is approximately a half to two thirds of the ultimate wall thickness of formed tube 10. Each rib of each pair 28 matches, end to end, with a corresponding rib 30 when the dies 16 and 18 are closed, and thereby defines the shape of each edge 12. The ribs 28 and 30 represent interruptions in the otherwise smooth cavity surfaces 28 and 30, and would require extra time and expense to produce. However, that would be a one time expense. As a practical matter, the ribs 28 and 30 would likely be cut as separate inserts and set into a channel carved into the cavity surfaces 20 and 22. This would not only be easier to control, but would allow them to be machined from a harder material, or even to be replaced with wear. A complex edge 12 shape such as that disclosed here could also be built up piece wise, out of substantially straight segments. To repeat, however the cutting ribs were provided, it would be a one time operation, embodied in the apparatus, and would not effect the actual operation of the method in terms of time or cost, as will be described next.

Referring next to FIGS. 5A and 5B, the forming operation per se is carried out as any hydroforming operation would be. Tube blank 14 is positioned between the dies 16 and 18, which are then closed around it. The yokes 24 and 26 close around the ends of blank 14, and plugs 32 are inserted to close off its interior. Those skilled in the art will recognize that the plugs 32 are depicted in very abbreviated fashion. In actual operation, a much more complex sealing apparatus would be needed at the ends, such as that disclosed in co assigned U.S. Pat. No. 5,233,856 issued Aug. 10, 1993 to Shimanovski, et al. which is herein incorporated by reference. However, such sealing devices are commercially available, and need not be depicted in detail for purposes of explaining the method of the subject invention. Once clamped and sealed, tube blank 14 is internally pressurized and expanded out into the cavity surfaces 20 and 22, as shown in FIG. 5B. Simultaneously with the expansion of tube blank 14, the ribs 28 and 30 cut partially into, but not through, its outer surface. This is an action that is transparent to the operator of the hydroforming process itself, with no effect on any of the monitored parameters, such as pressure or time. Since the surface is not cut through, there is no loss of fluid or pressure.

Referring next to FIGS. 2, 3 and 5C and 5D, the end result of the hydroforming process is an intermediate or rough formed tube blank indicated generally at 34. Intermediate tube blank 34 has two score lines or grooves 36 cut continuously around its outer surface, created by the ribs 28 and 30, which define two scrap ends 38 and 40. The scrap ends 38 and 40 must be cut away, as indicated in FIG. 3 in phantom line. However, given the complex shape of the grooves 36, mechanical fracturing, either by bending or pulling apart, would not be feasible or practical. Instead, a different method is used, which works in conjunction with the grooves 36 that are produced as an essentially cost free by product of the basic forming process.

Referring next to FIGS. 5C and 5D, the actual cutting process can be very simply described and illustrated. An electrical current is applied across groove 36 to a degree sufficient to melt away the thin layer of material left at groove 36. This is practicable because the material of tube 10 is conductive, and because the groove 36, while not deep enough to cut through, is continuous, and deep enough to significantly increase the resistance where it thins out the wall material. The electric current application is indicated simply with a + and − sign. In actual practice, conductive clamps shaped to fit closely around the intermediate tube blank 34 to either side of groove 36 would be employed, most likely as part of a larger apparatus in which intermediate tube blank 34 could be quickly clamped once removed from the dies 16 and 18. Such an apparatus is within the skill in the art, once the concept is understood. What that sufficient current will be will differ, of course, for each specific case, and could be determined empirically.

Figure 6:
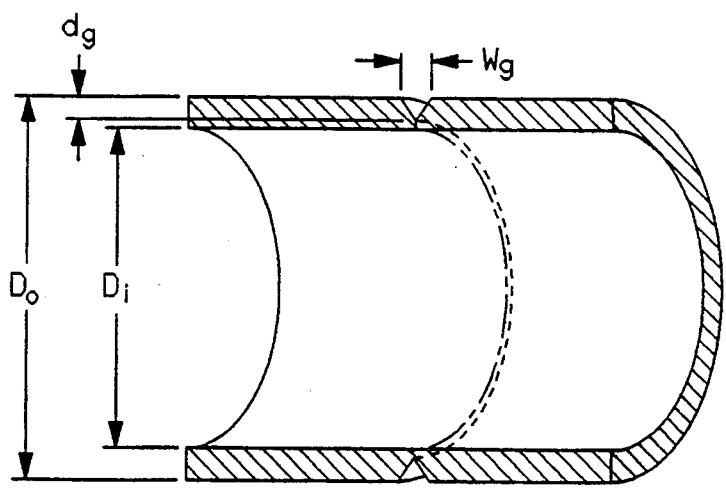
FIG. 6 is a schematic view of a scored tube showing the dimensions of and at the groove.

Referring next to FIG. 6, an example can be given to help illustrate the concept. A round tube with a groove is illustrated, though the same analysis could be applied to any shape tube. Round is just the simplest case, and since the tube starts out round, the analysis is valid no matter what shape the tube finally takes on. According to Joule's Law, the amount of heat generated when an electrical current is passed through a material can be expressed as:

$$h_g = 9.478 \times 10^{-4} i^2 rt$$

where:
$h_g$ = heat units generated (BTU)
i = current (amps)
r = resistance ($\Omega$)
t = time (seconds).

The amount of heat required to raise 1 pound of a material 1 degree Fahrenheit is known as the specific heat, denoted $c_m$. The amount of heat required to raise W pounds of material by a $\Delta T$ temperature differential is:

$$W \Delta T c_m$$

By equating the amount of heat required to raise the temperature of the material to the resistance to current flow, the result is:

$$W \Delta T c_m = 9.478 \times 10^{-4} i^2 r t$$

The resistance of the tube in the vicinity of the groove, which is greatly increased, can be expressed as:

$$r = \rho w_g / a$$

where:
- $\rho$ = resistivity of the tube material ($\Omega in^2/in$)
- $w_g$ = width of the groove measured parallel to the axis of the tube (in)
- $a$ = cross sectional area of the ring of tube material remaining radially inboard of the groove ($in^2$).

Substituting this expression for the tube resistance and solving for the current:

$$i = ((W \Delta T c_m a)/9.478 \times 10^{-4} \rho w_g t))^{\frac{1}{2}}$$

Finally, replacing the weight of the material to be melted (W) by the density of the material (d) times the volume of material [cross sectional area (a) times groove width $w_g$] gives:

$$i = ((c_m a^2 d \Delta T)/9.478 \times 10^{-4} \rho t))^{\frac{1}{2}}$$

where, again, $\Delta T$ represents the rise in temperature and d represents the density of the material. It will be noted that the width of the groove $w_g$ has dropped out as a factor at this point, and just the cross sectional area $a$ remains.

Still referring to FIG. 6, consider a steel tube with the following dimensions:

outside diameter ($D_o$) = 2.500 in inside diameter ($D_i$) = 2.380 in groove depth ($d_g$) = 0.050 in groove width ($w_g$) = 0.030 in and the following material properties:

$d_{steel}$ = 0.28 lb/in$^3$ $\Delta T_{steel}$ = 2520° F.

$\rho_{steel}$ = 6.3 × 10$^{-6}$($\Omega in^2/in$).

$c_m$ = 0.12 BTU/lb/degree F.

The cross sectional area of the annular ring of material to be melted, in terms of the dimensions given above, is:

$$a = \pi((D_o - 2d_g)^2 - D_i^2)/4$$

If it is desired to sever the tube in one second, substituting the area value above and t = 1 in the equation for i above gives a current of approximately 9000 amps. While this is a high current, it is well within the range of current spot welding equipment. Therefore, the process is more than feasible.

Variations in the disclosed method and apparatus could be made. The electric current applied across the groove could be used to cut to length no matter how the groove was formed, and even if the edge shape were simple enough to be formed by conventional mechanical means. Edge deformation would be reduced, even if the edge shape were simple. The method finds most utility with complex end edge shapes, however, and when used as an integral part of the hydroforming process. The part of the hydroforming process that lends itself well to the cutting process is the forcible expansion of the tube outwardly, into and against a solid die surface. This allows the ribs to form a groove of complex shape, without additional steps. Means other than the sharp ribs could conceivably be incorporated into the die cavities to create a groove in similar fashion. Movable blades could advance and move out of the cavity surface just as the expanded tube surface reached the cavity surface. This would be a more complex apparatus, but would still take advantage of the forcible outward expansion of the tube wall to create cutting force, even more force if combined with forcible inward movement of a cutting edge. Another possible way to integrate the cutting process even more fully into the hydroforming process would be to devise a tool to clamp and remove the intermediate formed blank 34 from the dies 16 and 18 which incorporated electrode clamps for applying the current simultaneously. Therefore, it will be understood that is not intended to limit the invention to just the embodiment disclosed.

The embodiments of the invention in which an exclusive property or privilege is claimed are defined as follows:

1. A combined method of forming a tube from a tube blank and cutting a complex end edge on said tube, comprising the steps of, providing a pair of dies having mating cavities with surfaces defining the desired final shape of said tube, said die cavities also having a pair of mating sharp ribs protruding from said cavity surfaces to a height less than the desired final wall thickness of said tube, said ribs matching said complex end edge shape, expanding said tube blank into said cavities, thereby simultaneously forcing said tube blank into pressurized contact with said sharp ribs and creating a formed tube blank with a groove continuously around said formed tube blank having a depth insufficient to cut through said formed tube blank but sufficient to locally increase the electrical resistance of said formed tube blank, and, applying an electrical current to said formed tube blank across said groove sufficient to melt said formed tube blank through at said groove, thereby forming said complex end edge and completing said tube.

* * * * *